United States Patent Office 3,190,724
Patented June 22, 1965

3,190,724
TEST FOR A MICROORGANISM DAMAGED COTTON
Jack Compton, Charlottesville, Va., and Winston H. Reed, Shelton, and Donald S. Buell, Trumbull, Conn., assignors to Institute of Textile Technology, Charlottesville, Va., a corporation of Virginia
No Drawing. Filed July 9, 1962, Ser. No. 208,342
8 Claims. (Cl. 23—230)

This invention relates to the testing of cotton to determine whether or not it has been damaged by microorganisms as well as to determine the extent of the damage.

Damage to cotton fibers resulting from the action of microorganisms has been observed in otherwise apparently good spinnable cotton. Cotton damaged or altered in properties by certain microorganisms has at times been called "cavitomic cotton." Such damage or alteration of the cotton results in embrittlement or weakening of the cotton fibers which in turn, results in shortened fibers, more waste, lower yarn strengths, high spinning end-breakage and lower processing levels. Processing mills must have some accurate and rapid test to determine whether or not the cotton to be processed has been damaged, as well as the extent of such damage in order to maintain low cost and product quality. A determination of such cavitomic cotton enables the mill to reject the cotton or to blend it with non-damaged cotton. Cavitoma damaged cotton appears to be increasing and the finding of adequate, dependable and rapid tests to determine the extent of such damage is of significant importance. It cannot be detected visually without the aid of a microscope or by the usual fiber tests.

It has been observed that cotton thus damaged has high pH values, generally above a pH of about 8.4. It is generally considered that if the cotton possesses a pH lower than about 7.4 it is not damaged. Between 7.4 and 8.4, it is considered to be damaged, and above 8.4 substantially damaged. As the pH increases above about 8.4, the extent of damage to the cotton correspondingly increases. This discovery led to what is referred to in the art as the hydrogen-ion concentration or pH test.

One such test was reported in "Textile Industries," 117, page 101, July 1953, by Hall and Elting. This test involved placing a small amount of an aqueous Gramercy Universal Indicator solution in a test tube and placing therein a cotton sample made up of pinches taken at random from one or more bales. The sample cotton is pushed through the solution in the test tube by a glass rod. The changes in color are noted, both as the cotton passes through the solution and as the cotton is pressed to the bottom of the tube. The colors produced are compared with standard colors for the indicator solution of known pH to determine the approximate pH of the cotton and extent of damage, if any.

Other test procedures include the extraction of test samples of cotton with water and the pH of the extract determined with, for example, a Beckman pH Meter. Tests such as these for detecting cavitomic cotton have been reported in the "Textile Research Journal" 21, page 580 (1951), and "Textile Industries" 120, page 127 (1956).

Such tests, however, are not always a safe index of damage. Even if localized areas of the cotton are damaged, the amount of damaged fibers present in the test samples may not be sufficient to influence the water extract of the entire sample or change in color of the indicator solution. For this reason, color changes in the solution or pH determinations by pH meters are often difficult to interpret in terms of damage. In addition, when using pH indicator solutions, the solutions used are unstable and new solutions must be prepared freqeuntly. Due to this instability of the pH indicator solutions, one is never sure whether or not the color produced gives an accurate determination of the extent of cavitoma damage.

According to the present invention, the cotton is tested for cavitoma damage by spraying onto the cotton an indicator solution in the form of a fine mist from a pressurized container in which the indicator solution is maintained substantially free of oxygen and under the pressure of an inert propellant gas and by determining from the color of the indicator solution on the cotton, the extent of damage thereto, if any.

Various indicators can be used to form the pressurized indicator solutions according to this invention so long as the indicator will exhibit a detectable color change over a pH range of sufficent breadth to permit an adequate determination of the damage which might be present in the cotton tested. An adequate pH range would be from about 7 to at least about 8.4 and preferably higher. The indicator is preferably one which will exhibit color changes over a pH range between about 7 and 11.

Since many of the known indicators only exhibit a color change over a narrow pH range, it is advantageous to use mixtures of indicators to extend the pH range. Two different indicator systems in separate pressurized containers, one of which would indicate the damage over the lower end of the pH range, say from 7.2 to 8.8, while the other would indicate the pH of the cotton sample between a pH from about 8.4 to 9.6 or above could also be used.

One indicator system which we have found to be advantageous consists of a mixture of Cresol Red and Thymol Blue dissolved in water. The color of the solution at a pH of about 7.2 is bright yellow. As the alkalinity of such a solution is increased, it gradually changes to orange and becomes orange at a pH of about 7.6. The indicator system then gradually changes to purple and becomes purple at a pH of about 8.9.

Other indicators which can be used include Orange I or Thropeolin–OOO, mixtures of Orange I with Brilliant Yellow (pH range 6.6 to 8.9), Phenol Red and Thymol Blue (pH range 6.8–9.6), and Phenol Red and Thymol Blue (pH range 7.2–9.6). Other indicators or combinations thereof can also be used as will be apparent to those skilled in the art.

A standard color chart is preferably prepared for each particular indicator system to show the colors exhibited by the system for various limited pH ranges or for a specific pH. The chart colors can then be compared with the color produced on the cotton by the pressure spraying of the indicator solution thereon to determine the pH of the cottton, and the cotton classified as undamaged, slightly damaged, damaged and so forth.

Although the indicators are designated herein by the common name used by those skilled in the art, the specific chemical compounds or compositions making up the indicators designated by the common names normally used can be obtained from existing literature. For example, Phenol Red is phenol sulfonphthalein, Cresol Red is O-cresol-sulfonphthalein, Orange I or Thropeolin-OOO is sodium naphthol-azo-benzene sulfonate, and Thymol Blue is thymol sulfonphthalein.

It is preferred to use water as a solvent for the indicators. Some indicators, however, are not sufficiently soluble in water and must be dissolved therein by using a small amount of alkali such as sodium hydroxide or other solubilization aids such as ethyl alcohol and acetone. At times, the particular solvent used to dissolve the indicator will affect the colors exhibited by the indicator at various pH's but as pointed out above, these must be correlated to a standard in any event, for subsequent use.

The amount of indicator used in solution can also be varied quite widely and this will depend to a great extent upon the indicator system employed. As a general rule, however, solutions containing anywhere from 0.05 to 0.2% by weight of the indicator or mixtures thereof will be sufficient. Generally, a slightly higher concentration of the indicator is more advantageous than was ordinarily used in prior methods. An indicator concentration of around 0.06 to 0.1% by weight has generally been found to be advantageous.

Propellants can be used to propel the indicator solution from the container so long as the propellant will not significantly affect or change the pH of the indicator solution being used, either by reaction between the propellant and indicator solution or by hydrolysis of the propellant alone in aqueous solution. There must, therefore, be a correlation between the particular propellant and the indicator solution being employed to effect this result. The propellant should preferably be lighter than the indicator solution so that it floats on top of the solution.

A preferred propellant in a substantially aqueous system is a mixture of 60% by weight iso-butane and 40% by weight dichlorodifluoromethane. Another preferred propellant is a mixture of about 92% by weight iso-butane and about 8% by weight normal propane. Iso-butane can also be used alone as a propellant. Other propellants which can be used in substantially aqueous systems include inert gases, such as nitrogen and argon, as well as mixtures of various fluorohydrocarbons with hydrocarbons such as a mixture of dichlorodifluoromethane and normal butane. The proportions of the mixed propellants using fluorohydrocarbons can be such that the mixture is lighter than the aqueous indicator solution contained in the presurized can, such as a mixture of 40% by weight dichlorodifluoromethane and 60% by weight isobutane.

The pressure of the propellants can be varied over a fairly wide range, depending upon the particular propellant system and the size of the valve opening used. Generally, a pressure within the range of about 25 to 60 p.s.i.g. for a liquefied gas system and of at least about 90 p.s.i.g. for a compressed gas system is preferred.

The proportion of the indicator solution and the propellant can also be varied quite widely. A pressurized formulation made up of about 95% by weight of the indicator solution with 5% by weight of the propellant is, however, advantageous when using a mixture of iso-butane and normal propane as a propellant.

The pressure of the propellants in the can should also be correlated with the type of valve or valve opening used so that the combination will give the desired spray rate and an even fine mist of the indicator solution when sprayed on the cotton samples to be tested and yet produce a sufficient force to insure penetration of the pressurized indicator solution into the cotton fibers of the sample in a substantially even manner. This results in significantly more accurate test results. If the spray is too fine, it will not penetrate the cotton fibers of the sample and will not settle adequately on the cotton. If the spray is too coarse, the distribution of indicator solution on the cotton will not be uniform and the test results will be erratic. The correlation of the type of valve used, for valve opening, with the pressure of the container can be determined to produce an even fine mist with adequate pressure and can be accomplished by those skilled in the art by routine experimentation, taking into account the viscosity of the indicator solution as well as the pressure in the can and the particular propellant used.

The containers, which can be used to package the indicator solutions under pressure as well as the valves employed, are conventional and of the type normally used to package other materials under pressure as will be apparent to those skilled in the art.

The cans can be filled by conventional procedures, but it is important, according to the present invention, that the cans be adequately purged using a single, and preferably a double, purge to insure that the can, when sealed and pressurized, is substantially free of oxygen and is maintained substantially free of oxygen. The can may be purged in various manners apparent to those skilled in the art. One procedure is to insert a fluorohydrocarbon, such as dichlorodifluoromethane, into the bottom of a can and permit it to evaporate and push the air out. The fluorohydrocarbon can be added to the can either before or after the indicator solution has been placed therein or it can be used both before and after the insertion of the indicator solution into the can. The indicator solutions should also be freshly prepared or maintained under a substantially oxygen-free atmosphere before inserting them into the substantially oxygen-free pressurizing container to insure that the solutions will not be adversely affected during the preparation and packaging stages, complete freedom of oxygen during the preparation and packaging stages, as well as during storage may not be necessary so long as the quantity of oxygen present does not interfere with or adversely affect the indicator solution.

Other additives can also be included in the pressurized can besides the indicator solution and the propellant to perform various functions as will be apparent to those skilled in the art so long as the additive does not significantly affect the pH of the indicator solution or otherwise interfere with the testing procedure.

The testing of cotton for cavitoma damage by spraying an indicator solution on the cotton to be tested from a pressurized container according to this invention results in a rapid and accurate test for cavitoma damage and is capable of detecting damage which would pass other known tests.

Spraying of the indicator solution from a pressurized container according to this invention breaks up the indicator solution into fine particles of substantial uniformity and these particles are forcefully applied by pressure to the cotton sample to be tested in a substantially uniform manner and the pressure with which the particles are tiansmitted to the cotton to be tested is such that it causes penetration into the cotton fibers giving a substantially complete and even coverage over and throughout the fiber. The pressure spray wets the cotton fibers and indicates the pH of the strands and is thus capable of detecting streaks of high pH cotton not discernible by other tests. When such localized damaged areas are sufficient in number, the spinnability of the cotton is affected and, depending upon the number of localized areas damaged, the cotton should either be rejected by the mill or integrated into a planned blending system.

The rapid transfer by pressure of the spray to the cotton fibers to be tested and the fine mist and penetration of the spray into the cotton fibers results in a more immediate response and prevents even an insignificant amount of oxidation of the indicator solution between the time it leaves the inert atmosphere of the pressurized container and the time of response, or change in color, on the cotton fibers. The use of a fine mist also reduces the amount of indicators which must be used and is thus a more economical method than those previously known.

The indicator solutions when packaged in pressurized containers and maintained substantially free of oxygen according to this invention also remain stable and give reliable tests for cavitomic cotton over a longer period of time than was previously possible. Indicator solutions pressurized according to this invention have remained stable and have given accurate and rapid results over periods in excess of six months.

The pressurized indicator solutions further have excellent wetting properties for the cotton without the use of a wetting agent when sprayed on the cotton by means of a propellant gas and for this reason also, produce more accurate tests for cavitomic cotton than those previously known.

The invention thus provides a test for cavitomic cotton which gives more information than previously known tests in addition to being faster, more accurate and more economical. These advantages are particularly significant when it is considered that damaged cotton fibers can cause shutdown of spindles due to excessive thread breakage and that prevention of the use of even one bale of damaged cotton in the mill can avoid considerable trouble and cost and results in a better quality of cotton.

*Example*

An indicator solution was prepared by mixing 0.03 gram of Cresol Red and 0.09 gram of Thymol Blue in two liters of distilled water containing a sufficient amount of alcohol and acetone to insure complete solubility of the indicators in the solution. A suitable and conventional 8-oz. open-type pressurizable can was then purged to free it from oxygen by running dichlorodifluoromethane into the open can, permitting the dichlorodifluoromethane to evaporate until all of the oxygen was removed therefrom. 180 grams of the indicator solution, as prepared above, were then charged into the can and a suitable valve applied and crimped over the open end of the can to hermetically seal the same and produce a pressure type can. The can was then pressurized by induction of a gas containing 91.2% by weight iso-butane and 8.8% by weight normal propane through the valve to give a final pressure in the can of about 40 p.s.i.g. at 70° F. The total weight of the propellant used was approximately 20 grams. The opening in the valve was correlated with the pressure and propellant used so that the indicator solution expelled therefrom would be in the form of a fine even mist sufficient to insure wetting of the cotton fibers and of sufficient pressure to insure penetration therein.

The indicator solution so packaged and pressurized was tested for color at pH's of 6.4, 7.6 and 8.9. The color at pH 6.4 was bright yellow, at 7.6 orange and at 8.9 purple. A chart corresponding to these colors at the various pH's was prepared and the yellow color designated as undamaged, the orange color as slightly damaged and the purple color as probably damaged. A small amount of the indicator solution was sprayed from the pressurized container onto 119 random samples of cotton to be tested for cavitoma damage and compared with other known means for testing cotton for cavitoma damage by the so-called pH test. When the results were compared with other methods of testing cotton for cavitoma damage by the so-called pH test, it was found that 35 of the samples (29.4%) were placed in the same classifications. 80 of the samples (67.2%) tested by the pressurized spray of the present invention were noticeably darker orange or purple in color indicating a possible change in the classification of the cotton being tested from undamaged to slightly damaged or slightly damaged to probably damaged, and 4 of the samples (3.4%) were sufficiently darker purple by the pressurized spray test to require a change in the classification from undamaged or slightly damaged to damaged.

We claim:

1. The method of determining microorganism damaged cotton which comprises maintaining a solution consisting essentially of a pH indicator solution substantially free of oxygen and under pressure of a propellant gas which is inert with respect to the indicator solution and will not significantly alter the pH of the indicator solution, spraying the indicator solution on cotton fibers in the form of a fine mist with sufficient pressure to wet and penetrate the cotton fibers substantially uniformly and comparing the color of the indicator solution on the cotton sample with the color of the indicator solution at various pH's to determine the extent of damage, if any, to the cotton.

2. The method of claim 1 in which the indicator solution will indicate, by color change, changes in pH over a range from about 7 to at least about 8.4.

3. The method of claim 2 in which the pH indicator solution is an aqueous solution of a mixture of Cresol Red and Thymol Blue having a pH range of 6.4 to 8.9.

4. The method of claim 1 in which the propellant is a mixture of iso-butane and dichlorodifluoromethane.

5. A pressurized unit for dispensing a pH indicator solution for determining microorganism damaged cotton which comprises a pressure container containing a solution consisting essentially of a pH indicator solution and a propellant gas which is inert with respect to the indicator solution contained therein and will not significantly alter the pH of the indicator solution, said pressure container being substantially free of oxygen and under a pressure sufficient to produce a fine mist capable of wetting and penetrating cotton fibers in a substantially uniform manner when the solution is expelled from the container by means of the propellant onto cotton fibers.

6. The pressurized unit of claim 5 in which the indicator solution will indicate by color change, changes in pH over a range from about 7 to at least about 8.4.

7. The pressurized unit of claim 6 in which the indicator solution is an aqueous solution of Cresol Red and Thymol Blue.

8. The pressurized unit of claim 5 in which the propellant gas is a mixture of iso-butane and dichlorodifluoromethane and which is lighter than the indicator solution.

References Cited by the Examiner

UNITED STATES PATENTS

| | | | |
|---|---|---|---|
| 1,929,573 | 10/33 | Whitehead | 8—147 XR |
| 2,524,590 | 10/50 | Boe | 252—305 |
| 2,617,780 | 11/52 | Lutz | 260—33.8 |
| 2,643,230 | 7/53 | Mooradian et al. | 23—253 XR |

OTHER REFERENCES

"Textile Research Journal" 21 (1951), pages 580–588.
"Handbook of Chemistry," N. A. Lange, 8th edition, 1952, pp. 944, 992 and 998.
"Aerosol Age," September 1957, pp. 19, 20, 23 and 25.

MORRIS O. WOLK, *Primary Examiner.*

JAMES H. TAYMAN, Jr., *Examiner.*